United States Patent [19]

Wich

[11] Patent Number: 4,586,656

[45] Date of Patent: May 6, 1986

[54] SOLENOID VALVE, PARTICULARLY AS BYPASS VALVE WITH FUEL INJECTOR

[75] Inventor: Thomas J. Wich, Springfield, Mass.

[73] Assignee: United Technologies Diesel Systems, Inc., Springfield, Mass.

[21] Appl. No.: 640,648

[22] Filed: Aug. 14, 1984

[51] Int. Cl.[4] .................... F02M 37/04; F16K 31/02

[52] U.S. Cl. .................................... 239/88; 239/127; 239/585; 123/458; 123/506; 251/129.16; 251/129.21

[58] Field of Search ...................... 239/88, 90, 91, 95, 239/124, 127, 585; 137/508; 251/129, 141, 129.16, 129.21; 123/458, 506

[56] References Cited

U.S. PATENT DOCUMENTS

| | | | |
|---|---|---|---|
| 3,742,918 | 7/1973 | Murtin et al. | 123/458 |
| 4,211,202 | 7/1980 | Hafner | 239/88 X |
| 4,351,283 | 9/1982 | Ament | 123/506 X |
| 4,482,094 | 11/1984 | Knape | 239/585 X |

*Primary Examiner*—Joseph F. Peters, Jr.
*Assistant Examiner*—Mary Beth O. Jones
*Attorney, Agent, or Firm*—Stephen A. Schneeberger

[57] ABSTRACT

A normally-open, solenoid-controlled valve rapidly controls the flow of liquid between a high pressure supply and a relatively lower pressure drain. The valve includes a stationary valve-seat spindle and a cylindrical valve sleeve encircling and slidable along part of the valve-seat spindle. The valve-seat spindle is provided with an annular control edge and the valve sleeve includes a frustoconical pressure-responsive contact surface which is moved into and out of valve-closing contact with the control edge by means of axial reciprocation of the valve sleeve between valve-closed and valve-open positions. The valve-seat spindle includes a flow passage therein which is in continuous fluid communication with a high pressure fluid inlet in a valve housing and which extends to and discharges into a plenum region formed between the spindle and the sleeve adjacent to the control edge and relatively toward that part of the seat spindle along which the valve sleeve slides. When energization of the solenoid is discontinued, the high pressure liquid in the plenum acts axially on the valve sleeve, and particularly the pressure-responsive contact surface, to rapidly open the valve. The response rate and simplicity of the valve are enhanced by the absence of a biasing spring. The valve is suited for use as a bypass valve in integral combination with a high pressure fuel injector nozzle of the pressure-responsive type.

12 Claims, 5 Drawing Figures

PSI

SOLENOID VALVE, PARTICULARLY AS BYPASS VALVE WITH FUEL INJECTOR

DESCRIPTION

1. Technical Field

The invention relates to a solenoid valve and more particularly to a solenoid-controlled bypass valve. More particularly still, the invention is concerned with a solenoid bypass valve in combination with a pressure responsive fuel injector.

2. Background Art

Solenoid-controlled valves have long been used for regulating the flow of liquids, as in various water delivery systems and more recently in fuel delivery systems for automotive application. In this latter regard, solenoid-controlled valves have been used to directly control the admission of gasoline to spark ignited engines. More recently, attention has been given to the use of solenoid-controlled valves for indirectly controlling the admission of fuel to compression ignition or diesel engines. Examples of such latter solenoid-controlled valves may be found in U.S. Pat. No. 3,851,635 to Murtin et al, U.S. Pat. No. 4,258,674 to Wolff, U.S. Pat. No. 4,392,612 to Deckard et al, and U.S. Pat. No. 4,343,280 to Luscomb.

In the instance of U.S. Pat. No. 3,851,635, the solenoid-controlled valve is located separately from the fuel pump and the fuel injector and provides a normally-open bypass function. In U.S. Pat. No. 4,258,674, the solenoid-controlled servo valve is incorporated as part of the injector assembly and provides a pressure balancing function to the injector valve until such time as injection is desired, whereupon it allows an injector-opening pressure differential. In U.S. Pat. No. 4,343,280 a bypass valve and its solenoid-controlled pilot valve are part of a jerk pump. In the instance of the first-mentioned patent, little or no attention is given to the general structure and positioning of the solenoid-controlled valve. Moreover, its hydraulic response is sufficiently slow that a pair of complementary solenoid valves are disclosed for effecting faster response. U.S. Pat. No. 4,258,674 discloses a solenoid-controlled spool-type servo valve which is used to apply a balancing pressure to the injector valve for part of the operating cycle and to relieve or bypass the fuel providing that balancing pressure when it is desired to open the injector. The U.S. Pat. No. 4,392,612 discloses a unit injector in which a spring-biased bypass valve is controlled by a solenoid to effect fuel injection. In U.S. Pat. No. 4,343,280, the bypass valving and its control are relatively complex.

In the instance of each of the aforementioned patents, the solenoid valve or bypass valve is provided with a mechanical biasing element, such as a biasing spring to facilitate positive return of the valve to its normal or rest position (open or closed) when the solenoid is non-energized. Where the valve serves a bypass function, its rapid opening is important to achieving an abrupt termination of fuel injection which in turn is required by constraints on exhaust emissions. However, such biasing springs contribute to the volume and complexity of a valve which is directly or indirectly controlled by a solenoid and may additionally contribute to the load or force which the solenoid must overcome in actuating the valve.

Copending application U.S. Ser. No. 640,640 entitled "Fuel Delivery Control System" filed on even date herewith by the inventor herein and assigned to the same assignee as herein, discloses a fuel delivery control system in which a solenoid-controlled bypass valve positioned relatively close to the fuel injector and affording a rapid response to control signals is desired.

DISCLOSURE OF INVENTION

Accordingly, it is an object of the present invention to provide a solenoid-controlled valve capable of rapid response in both the opening and closing directions.

It is a further object of the present invention to provide a solenoid-controlled valve which eliminates the requirement for a mechanical biasing element.

It is a still further object of the present invention to provide a solenoid-controlled, normally-open bypass valve of relatively simple and economical construction.

It is an even further object of the present invention to provide an improved solenoid-controlled bypass valve particularly suited for combination with a pressure responsive injector valve and possessing the characteristics of the foregoing objects.

In accordance with the present invention there is provided a normally-open, solenoid-controlled valve for rapidly controlling the flow of liquid between a high pressure supply and a relatively lower pressure drain. The valve includes, within a housing, a stationary valve-seat spindle and a cylindrical valve sleeve encircling and slidable along part of the valve-seat spindle. The valve-seat spindle is provided with an annular control edge and the valve sleeve includes a pressure-responsive contact surface which is moved into and out of valve-closing contact with the control edge by means of axial reciprocation of the valve sleeve between valve-closed and valve-open positions. An armature is operatively connected to the valve sleeve and a solenoid coil is positioned to provide valve-closing actuation of the armature and valve sleeve when an electrical current is applied to the coil. The valve-seat spindle includes a flow passage therein which is in continuous fluid communication with a high pressure fluid inlet in the valve housing. That flow passage extends to and discharges into a plenum region formed between the spindle and the sleeve adjacent to the control edge and relatively toward that part of the seat spindle along which the valve sleeve slides. When the valve is open, liquid flows from this plenum region, past the control edge and out of the valve housing at a drain outlet. Energization of the solenoid coil serves to close the valve and prevent such liquid flow. When energization of the solenoid is discontinued, the pressure of the high pressure liquid in the plenum acts axially on the valve sleeve, and particularly the pressure-responsive contact surface, to rapidly open the valve and allow flow of the liquid to resume. The response rate and simplicity of the valve are enhanced by the absence of a biasing spring.

The valve-seat spindle is fixed in a stationary position in the valve housing and includes a first axial portion of one diameter and about which the valve sleeve closely slides. The annular control edge is of greater diameter and is thus formed in a portion of the valve-seat spindle which is of greater diameter. The contact surface on the valve sleeve is substantially frustoconical relative to the sleeve axis and its apex extends in the direction of the valve opening. In a preferred arrangement, the valve-seat spindle and the valve sleeve are oriented substantially vertically and the valve sleeve opens in the downward direction such that the force of gravity aids in keeping the valve open. The flow passage in the valve-seat spindle is provided by an axial bore intersected by one or more radial bores which in turn discharge to the plenum. The valve-seat spindle is urged into permanent sealing engagement with a surface of the valve housing and with its axial bore in registry with the inlet in the housing.

The solenoid valve is particularly suited for use as a bypass valve in integral combination with a high pressure fuel injector nozzle of the pressure responsive type. The solenoid-controlled bypass valve is mounted to the nozzle body of the injector. The nozzle body includes a high pressure fuel passage which extends therein to the injector valve. The injector valve opens when the fuel pressure exceeds a particular threshold. The high pressure fuel passage additionally extends in the nozzle body to the inlet for the solenoid-controlled bypass valve. When the bypass valve is open, the fuel pressure in the injector is below the threshold necessary for injection, however that pressure may increase above the injection threshold when the bypass valve is closed.

BEST MODE FOR CARRYING OUT THE INVENTION

Figure 1:
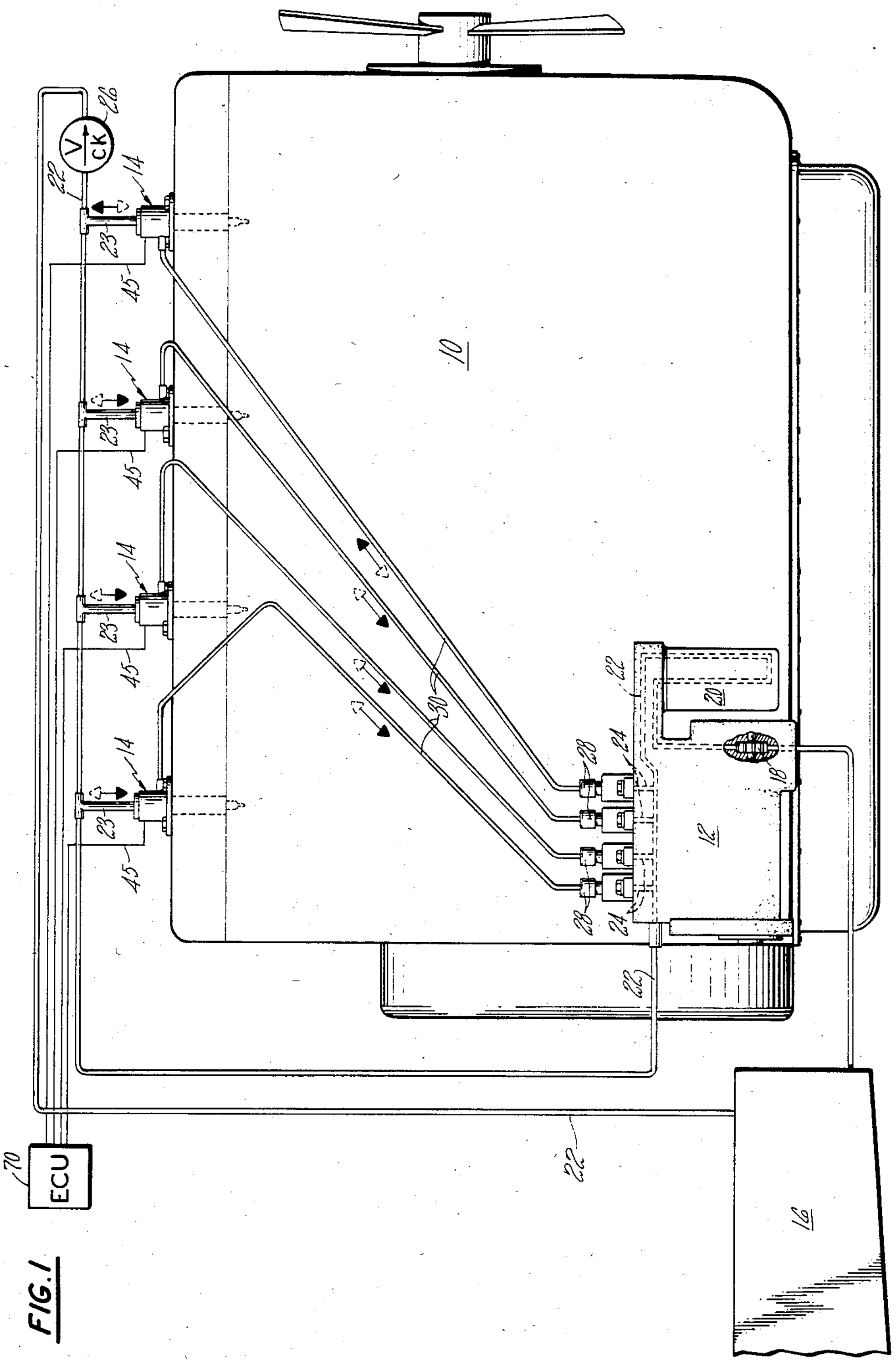
FIG. 1 is a generalized schematic view of the complete fuel system of a four-cylinder engine embodying the invention.

Referring to FIG. 1 there is schematically illustrated a fuel delivery system for a compression-ignition or diesel engine 10 in accordance with the invention. For purposes of describing the invention, the engine 10 will be presumed to be a four cylinder, naturally aspirated, medium duty diesel engine having a displacement of approximately one liter per cylinder. Correspondingly, a relatively high pressure, four cylinder, in-line fuel pump 12 is driven by engine 10 for providing intermittent or periodic pulses of fuel flow to respective bypass valve and injector assemblies 14. The pump 12 is capable of delivering fuel pulse pressures as great as about 15,000 psi (approximately 1,000 bar) for direct injection. It will be understood that the fuel delivery system of the invention may be used with diesel engines of numerous different configurations and that the pump 12 might alternatively be constituted of individual unit pumps each incorporated with the engine.

Fuel is drawn from a source, such as fuel tank 16, by a supply pump 18. Supply pump 18 is of the continuously operating type and may be associated with pump 12 in a known manner or may exist as a stand-alone pump which is driven electrically or by a mechanical takeoff from the engine 10 or the pump 12. The supply pump 18 provides a continuous supply of fuel at a relatively low pressure of about 45 psi (3 bar). The output of supply pump 18 is passed through a filter 20 whereupon it enters a low pressure supply conduit 22. The low pressure supply conduit 22 may also serve in some instances to provide a drain, as will be hereinafter described. The low pressure supply conduit 22 extends, as represented by branches 24, to each of the four pumping cylinders within the in-line pump 12. The low pressure supply conduit 22 also includes separate branches 23 extending to each of the respective injector assemblies 14. Finally, the supply conduit 22 returns to the fuel tank 16 via a low pressure check valve or orifice 26.

Each cylinder of the pump 12 includes a respective outlet 28 which forms one end of a respective fuel conduit 30. Each fuel conduit 30 is suited for the delivery of high pressure pulses of fuel to respective injector assemblies 14. Importantly to the invention, each fuel conduit 30 is of a predetermined length selected to provide a requisite hydraulic delay between the start of a pilot pulse and the start of the main fuel pulse, which delay is intended to correspond with the engine's characteristic ignition delay, as will be hereinafter described in greater detail.

Figure 2:
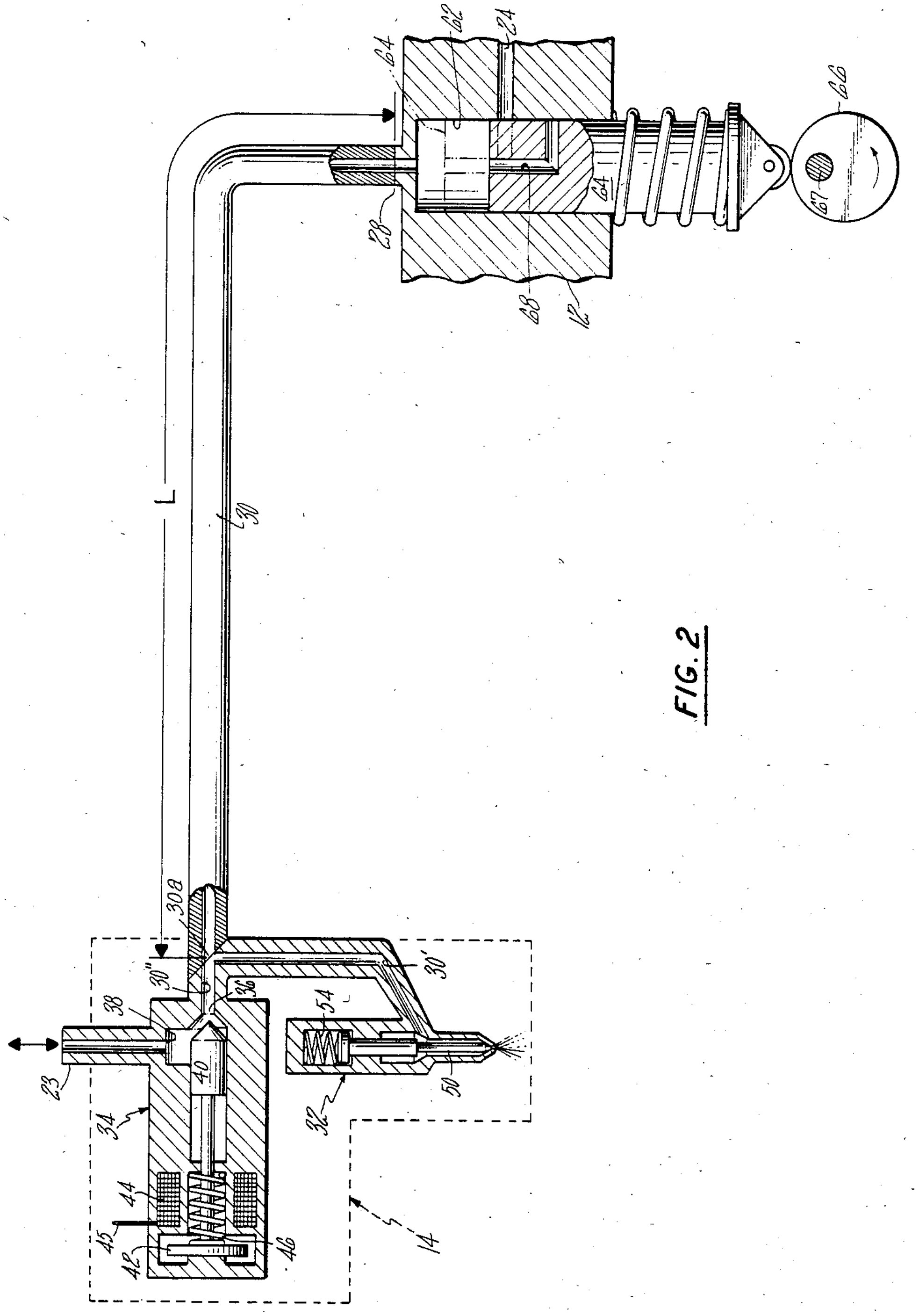
FIG. 2 is a functional schematic illustration of the fuel supply system of the invention in a simplified form.
Figure 3:
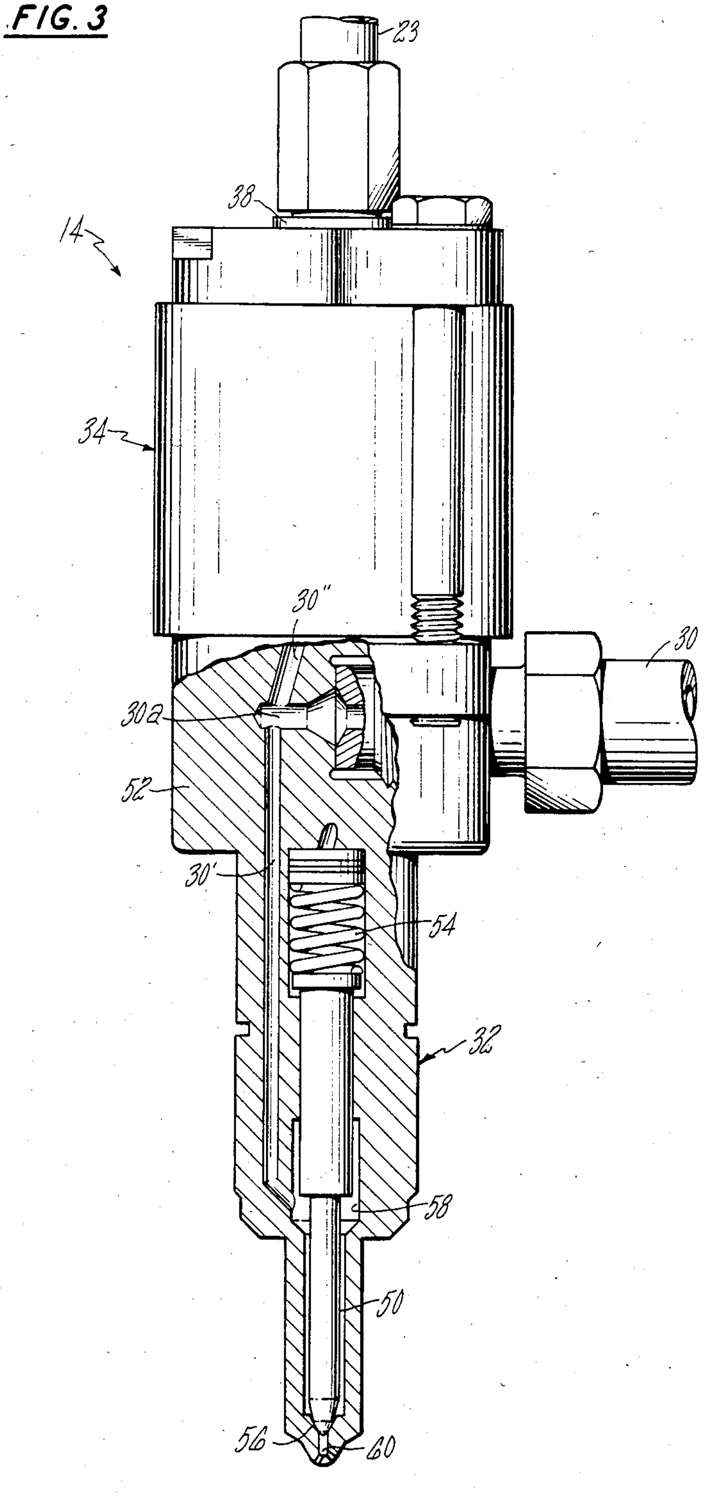
FIG. 3 is a sectional view of a fuel injector valve including a solenoid-actuated bypass valve in accordance with the present invention.

Referring to FIGS. 1, 2 and 3, each bypass valve and injector assembly 14 is depicted as including an injector nozzle 32 and a bypass valve 34. Although the injector 32 and the bypass valve 34 may be housed separately as depicted in FIG. 2 for diagrammatic illustration, they may also be and preferably are, located in a common housing as illustrated in FIG. 3. Each bypass valve 34 includes a pair of ports 36 and 38, with port 36 being connected directly to high pressure conduit 30 and port 38 being connected to the low pressure supply branch conduit 23. The bypass valve 34 includes a valve element 40 joined with an armature 42 for electromagnetic actuation by energizaton of the coil 44 of a solenoid. The solenoid coil 44 is energized by a signal current applied thereto on a pair of wires represented by a single line 45. The solenoid-actuated bypass valve 40 is in a normally-open condition, as symbolically represented in FIG. 2 by the existence of a spring 46. Energization of coil 44 by the application of an appropriate signal on line 45 serves to rapidly close the bypass valve 34 and conversely, an appropriate signal, such as the cessation of electrical current, allows the valve to rapidly reopen.

The fuel injection nozzle 32 includes a needle valve element 50 contained within nozzle body 52 and biased by spring 54 into valve-closing engagement with a valve seat 56. When the fuel pressure within chamber 58 is sufficient to overcome the biasing force of spring 54, the needle 50 lifts from seat 56 in a known manner to inject fuel directly into the engine via nozzle orifice 60. The fuel which serves both to open the injector valve 50 and to supply fuel to the engine 10 is supplied to injector chamber 58 via an extension 30' of the high pressure fluid conduit 30.

FIG. 2 diagrammatically illustrates one of the pumping chambers 62 in the in-line pump 12 which serves as the source of pressurized pulses of fuel flow through a respective conduit 30. A piston or plunger 64 reciprocates within the pumping chamber 62 to provide the pressurized pulses of fuel flow. Reciprocation of each plunger 64 is effected by a cam 66 mounted on a shaft 67 and driven directly or indirectly by the engine 10. Pump 12 may for the most part be of a type which is commercially available from any of several pump manufacturers; however, such pump must be modified since the control racks, control mechanisms for control of the pump output and pump delivery valves are not necessary. Additionally, no provision need be made for adjusting the timing of cam 66 during operation. Plunger 64 is depicted at the bottom of its operating stroke, illustrating that the port to the conduit 24 associated with the low pressure supply remains covered. As the plunger 64 is driven upward by the cam 66 it forces fuel contained in pumping chamber 62 out through high pressure conduit 30 for bypass through the bypass valve 34 or for injection through injector 32, as will be hereinafter described. As the plunger 64 nears the top of its stroke, a venting bore 68 formed therein moves into registry with the supply conduit 24, as illustrated in dotted line, to allow fuel to flow in either direction.

When plunger 64 is at the top of its stroke, the registry of venting bore 68 with supply conduit 24 ensures that the small remaining volume of pumping chamber 62 is completely filled with fuel to begin an intake stroke. On the downward stroke of the plunger 64 the venting bore 68 will move out of registry with conduit 24 and thus create a suction within the pumping chamber 62. In accordance with an aspect of the invention, the pumping chamber 62 is not provided with a delivery valve at its outlet and the bypass valve 34 will be open at this stage of operation such that fuel is allowed to flow reversely through a respective low pressure supply branch 23 and reversely through a respective high pressure conduit 30, thereby ensuring full charge of fuel in the respective pumping chamber 62 when the plunger 64 reaches the bottom of its stroke. Typically, most of the fuel charge in pumping chamber 62 (i.e., 75–85%) will be supplied by such reverse flow in conduit 30. Solid and broken-line arrowheads have been used in conduit branches 23 of FIG. 1 to illustrate the possible flow in either direction in each, with any three flowing in the reverse direction while one flows in the forward direction.

The general timing of the initiation and termination of fuel injection to engine 10 is determined by the electronic control unit 70 which provides control signals via respective lines 45 to the respective bypass valves 34. Generally speaking, the electronic control unit 70 will respond to sensed engine operating parameters such as speed, load, temperature and the like to provide control signals in accordance with a predetermined control program. Inasmuch as each bypass control valve 34 is normally open, the control afforded by electrical signals on lines 45 normally involves the closing of the valve 34 by energization of coil 44 and the reopening of the valve by discontinuing such energization of the coil. During the time a bypass valve 34 is open, fuel flow may occur in either direction past the valve through branch conduit 23 and high pressure conduit 30. The capacities of branch conduits 23 and high pressure conduits 30 are such that the pressure of fuel flowing therein when bypass valve 34 is open is relatively low even though a pumping plunger 64 is in its upward stroke. Accordingly, the fuel pressure appearing in extension conduit 30' to a respective injector 32 is normally below the threshold level required to overcome the bias of spring 54 for opening the injector.

However, if bypass valve 34 is closed and the plunger 64 is in its upward stroke, the pressure of the fuel in conduit 30 and extension 30' will increase and will overcome the bias of injector spring 54 to allow injection of fuel into the engine. Absent a consideration of the flow dynamics occasioned by a sudden closing of the bypass valve 34, the fuel pressure in conduit 30 would be determined by the stroke of plunger 64 which is controlled by the profile of cam 66. That pressure increases during the plunger's upward stroke, the rate of increase moderating somewhat when the injector 32 opens.

In accordance with the invention the rapid closing of bypass valve 34 during the pumping stroke of a respective plunger 64 operates to immediately stop the flow of fuel at the inlet port 36 to the bypass valve, which results in a rapid and significant rise in the pressure of the fuel in that region. This phenomenon in water pipes is known as "water hammer" and for the purposes of the present invention, is referred to as "fuel hammer". This rapid increase in the fuel pressure in conduit 30 occurs most immediately in the region of bypass valve inlet port 36, and thus also soon thereafter in the region of injector 32 inasmuch as the conduit extension 30' is relatively short compared to the overall length of conduit 30 and is in general proximity with the inlet port 36 of the bypass valve. This rapid pressure increase is such that the opening bias in injector 32 is overcome and injection of fuel into engine 10 begins.

Further in accordance with the invention, the rapid rise in the pressure of the fuel in conduit 30 at bypass valve 34 travels the short distance of any conduit extension 30'' to the node or junction $\mathbf{30}_a$ at which conduit extension 30' joins conduit 30, and then travels back along conduit 30 to the outlet 28 and pumping chamber 62 of pump 12, whereupon it is reflected back along conduit 30 toward the injector 32. Because the closure of bypass valve 34 occurs during the compression stroke of plunger 64, the pressure traces depicted in FIG. 5 result.

Figure 5:
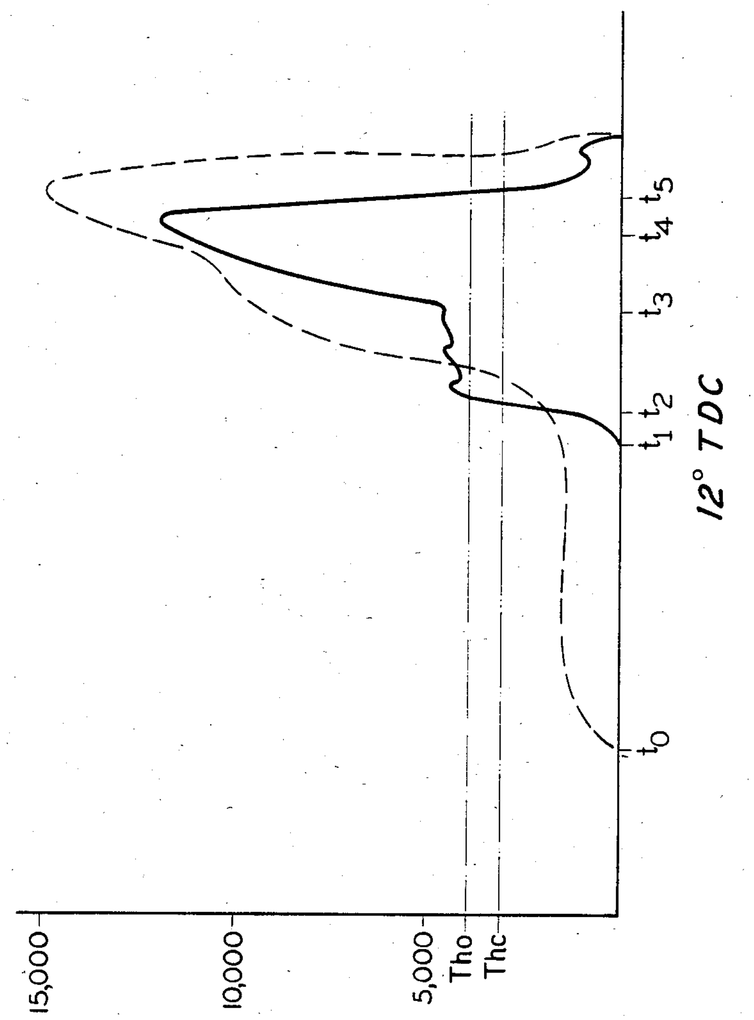
FIG. 5 is a diagram illustrating the fuel pressure at the injector and the fuel pressure at the pump each as a function of crank angle.

Referring to FIG. 5, the pressure at the outlet 28 of a pumping chamber 62 of pump 12 is illustrated in dotted line as a function of time. It will be appreciated that the scale of the X-axis might alternatively have been crank angle or pump cam angle at some engine operating condition, however a time base more appropriately illustrates the principles of the invention.

The solid line trace in FIG. 5 depicts the pressure of fuel in conduit 30' at the injector 32. The pressure at pump 12 increases very gradually between $t_0$ and $t_1$ as the plunger 64 begins its compression stroke and the bypass valve 34 remains open. At time $t_1$ a control signal is applied to line 45 and the bypass valve 34 rapidly closes. The fuel pressure in conduit 30' at the fuel injector 32, and specifically in chamber 58 of the injector, rapidly increases from less than 1,000 psi to a level at $t_2$ which exceeds the opening threshold pressure, $Th_o$. The delay between $t_1$ and $t_2$ is determined mainly by the response time of the bypass valve 34 plus a hydraulic delay proportional to the length of conduit 30'. Typically conduit 30' will be relatively short. In the present embodiment the pressure at which injector 32 opens is approximately 4,000 psi and this initial fuel pressure pulse may have a pressure of about 5,000 psi. Then, both because the needle 50 of the fuel injector 32 has opened and because the pressure pulse is moving upstream along conduit 30 while the pumping plunger 64 is continuing its upward stroke, there is relatively little change in the fuel pressure in conduit 30' at injector 32 for a hydraulic delay interval (HD) which is controlled to substantially correspond with the characteristic ignition delay (ID) of the engine 10.

This interval HD is depicted in FIG. 5 as extending from time $t_2$ until $t_3$ and it is determined by the length L of conduit 30 between pump 12 and conduit node $\mathbf{30}_a$. This delay interval HD, is determined principally by the time it takes the pressure pulse generated by the abrupt closing of bypass valve 34 to travel the length L of conduit 30 from node $\mathbf{30}_a$ to the pump 12 and back again. It will be appreciated that the length of conduit extension 30′ will not affect the length of the interval HD. The length of conduit extension 30′ does not affect the interval HD because the initial pressure pulse is also moving toward pump 30 while it is moving along extension 30′. Thus, if a particular type or class of engine 10 is tested and seen to have a characteristic ignition delay ID of approximately 1 millisecond, it will be desirable that the hydraulic delay interval HD from $t_2$ to $t_3$ on FIG. 5 is also approximately 1 millisecond. Typically the speed of such a pressure pulse within the liquid fuel medium and at the pressures present will tend to be in the range of 4,000 ft/sec±several hundred ft/sec. Accordingly, assuming a pulse velocity of approximately 4,000 ft/sec in conduit 30, the length L of that conduit 30 may be preselected to provide the hydraulic delay which corresponds with the requisite ignition delay. By using the basic equation for time, distance and velocity, which is:

$$T=D/V,$$

where

T=the time of travel,

V=velocity, and

D=distance traveled, the parameter T may be replaced with HD which represents the desired hydraulic delay and the parameter D may be replaced with 2L which represents twice the length of the conduit 30, or in other words the "round-trip distance" of a pulse which originates near the injector and travels to the pump and returns. Using the foregoing expression, the distance D should be about four feet and thus the conduit length L should be about two feet.

Each conduit 30 should have the same length L. Apart from some relatively minor variations caused by variations in fuel density as a result of composition and pressure, the pulse velocity of 4,000 ft/sec may be considered a constant. On the other hand, characteristic ignition delays for differing types of engines may range from approximately 0.5 millisecond to slightly over 1 millisecond. Thus, in the instance of a desired 0.5 millisecond ignition delay, the length L will need to be approximately one foot. It will be appreciated that the shorter the length L is required to be, the closer the pump 12 will need to be to the several injectors 32 such that the length L of the conduits 30 to each respective injector need not exceed approximately one foot. Conversely, if the conduit length L is required to be relatively long, it may be accommodated by a curved or serpentine patterning of the conduit.

Returning to an analysis of the fuel pressure at injector 32 as illustrated in FIG. 5, it will be observed at time $t_3$, following the hydraulic delay, that the return of the reflected pressure pulse coupled with the rapidly increasing compression afforded by the pumping plunger 64, results in a significant secondary increase in the fuel pressure. This secondary increase in fuel pressure is relatively rapid and large, such that the fuel pressure at the injector 32 increases from about 4,000 or 5,000 psi to about 12,000 or 13,000 psi. While the initial phase of the fuel delivery may be characterized as providing a pilot fuel pulse starting at time $t_2$, this secondary stage serves to provide the main fuel pulse which supports most of the combustion occurring in the engine. The pilot fuel pulse will have mixed with the air in the engine and increased to an ignition or near-ignition temperature and the immediate follow-on of the main fuel pulse serves to optimize the fuel combustion process. Most of the fuel is injected during the main fuel pulse, with only about 25–35% being injected during the pilot phase.

The main fuel pulse is terminated by reopening the bypass valve 34 at time $t_4$ whereupon, following the brief interval required to transit conduit extensions 30″ and 30′, the fuel pressure at the injector 32 rapidly drops below the closing threshold, $Th_c$, of about 3,000 psi at time $t_5$ and injection is terminated. It will be noted that the pressure at pumping chamber 62 drops off rapidly also, but is delayed slightly as a result of the length of the conduit 30.

Clearly, if the main fuel pulse is to start at a time $t_3$ which has some predetermined correlation with a particular crank angle or cam angle, the closure of valve 34 will need to be timed such that $t_2$ occurs at the predetermined hydraulic interval HD prior to that desired instant for $t_3$. This hydraulic delay HD is determined by length L of conduit 30, and the desired time for $t_1$ is determinable and is substantially constant relative to $t_3$. Of course, the crank or cam angles of these times will vary with speed.

In accordance with the invention, it is desirable that the bypass valve 34 be capable of closing its valve element 40 as rapidly as possible so as to effect the rapid pressure rise between $t_1$ and $t_2$ seen in FIG. 5. It is also desirable that value 34 be capable of rapidly opening its valve element 40 to abruptly terminate fuel injection. Moreover, it is preferable that the bypass valve 34 and the injector 32 be positioned as close to one another as possible to simplify the fluid dynamics of the system. The particular solenoid-actuated, pressure-assisted bypass valve 34 illustrated in FIGS. 3 and 4 in integral combination with the injector 32 is particularly suited to this end.

Referring to FIG. 3, the high pressure conduit 30 is operatively connected to the injector nozzle body 52 which is located node $30_a$ and from which extends conduit branch 30′ to the injector chamber 58 and conduit branch 30″ extending toward the bypass valve 34. Conduit extension 30″ extends upwardly in valve body 52 to an opening positioned centrally in the upper surface 74 of the nozzle body. The solenoid-actuated bypass valve assembly 34 is positioned immediately above nozzle body 52 and is integrally joined therewith, as by a pair of hold-down bolts extending through a flange in valve cover 76 and into threaded engagement with a corresponding flange on the valve body 52. The active elements of the bypass valve are located in a housing cavity formed between the spaced, axially-opposing faces of valve cover 76 and nozzle body 52 and radially within a cylindrical collar 77 whose opposite ends extend around the valve cover 76 and the upper end of nozzle body 52 respectively.

A rod-like or spindle-like valve seat member 37 extends axially between the upper surface 74 of the nozzle body 52 and the cover 76. Valve seat 37 includes an upwardly-extending blind bore which defines at least part of inlet port 36. The valve seat 37 is positioned such that the bore or port 36 is aligned with the upper end of conduit 30″. The lower end of valve seat 36 is urged into substantially fluid sealing engagement with the upper surface 74 of nozzle body 52 by means of one or more Belleville washers 78 acting downwardly upon a surface of a shoulder of valve seat 37 and upwardly upon the undersurface of cover 76. The concentric positioning of the valve seat 37 and the retention of the Belleville washer 78 on that valve seat may be assured by a pilot pin 79 extending from the upper end of the valve seats and into a centered bore in the undersurface of cover 76. Belleville washers 78 typically apply a 200–300 pound downward force on valve seat 37 to maintain it in substantially fixed sealing engagement with the upper surface 74 of the injector body 52.

The valve-seat spindle 37 has a constant diameter over most of its lower extent and includes a region of larger diameter thereabove. In the region of larger diameter there is formed an annular control edge 80 whose diameter is greater than that of the lower spindle portion of the valve seat 37. An annular recess 81 is machined in the valve seat 37 immediately below the control edge 80 both to form that control edge and to provide a small high pressure plenum 81' adjacent to the valve seat. One or more radial bores 36' extend inwardly from the recess 81 to the axial port bore 36 to provide liquid communication between the port 36 and the plenum formed by the recess.

In the solenoid-actuated valve 34, the moving valve element is a valve sleeve 140 comprised of a cylindrical valve sleeve disposed about the lower portion of valve seat 37 and sized for close axial sliding relation therewith. The inner diameter of the valve sleeve 140 is, for most of its length, only slightly larger than the outside diameter of the lower portion of the valve seat 37 and somewhat less than the diameter of the control edge 80 of the valve seat 37. On the other hand, the outside diameter of the valve sleeve 140 is greater than the diameter of the control edge 80, and the transition from the inside diameter to the outside diameter near the upper end includes an upwardly inclined or inverted frustoconical surface 82 for contacting the control edge 80 when the valve is closed. Part of the inner surface of sleeve 140 and some of surface 82, cooperate with recess 81 in seat spindle 37 to define the plenum 81'. An annular armature 42 is joined to the valve sleeve 140 near its lower end, as through threaded engagement or preferably by means of a snap ring 83 received in a recess in the sleeve 140 and retaining the armature in fixed engagement with a shoulder of that sleeve. A plurality of bleed holes 84 extend axially through the armature 42 to minimize fluid resistance during actuation.

An annular stator structure 85 which includes the solenoid coil 44 as an integral part thereof, surrounds and is outwardly spaced from the valve sleeve 140. Stator 85 is positioned against the undersurface of cover 76 and is maintained in predetermined spaced relation with the upper surface 74 of the injector body 52 by means of an annular spacer 87. The leads from the coil 44 extend to a pair of terminals, here represented by a single terminal 45.

Figure 4:
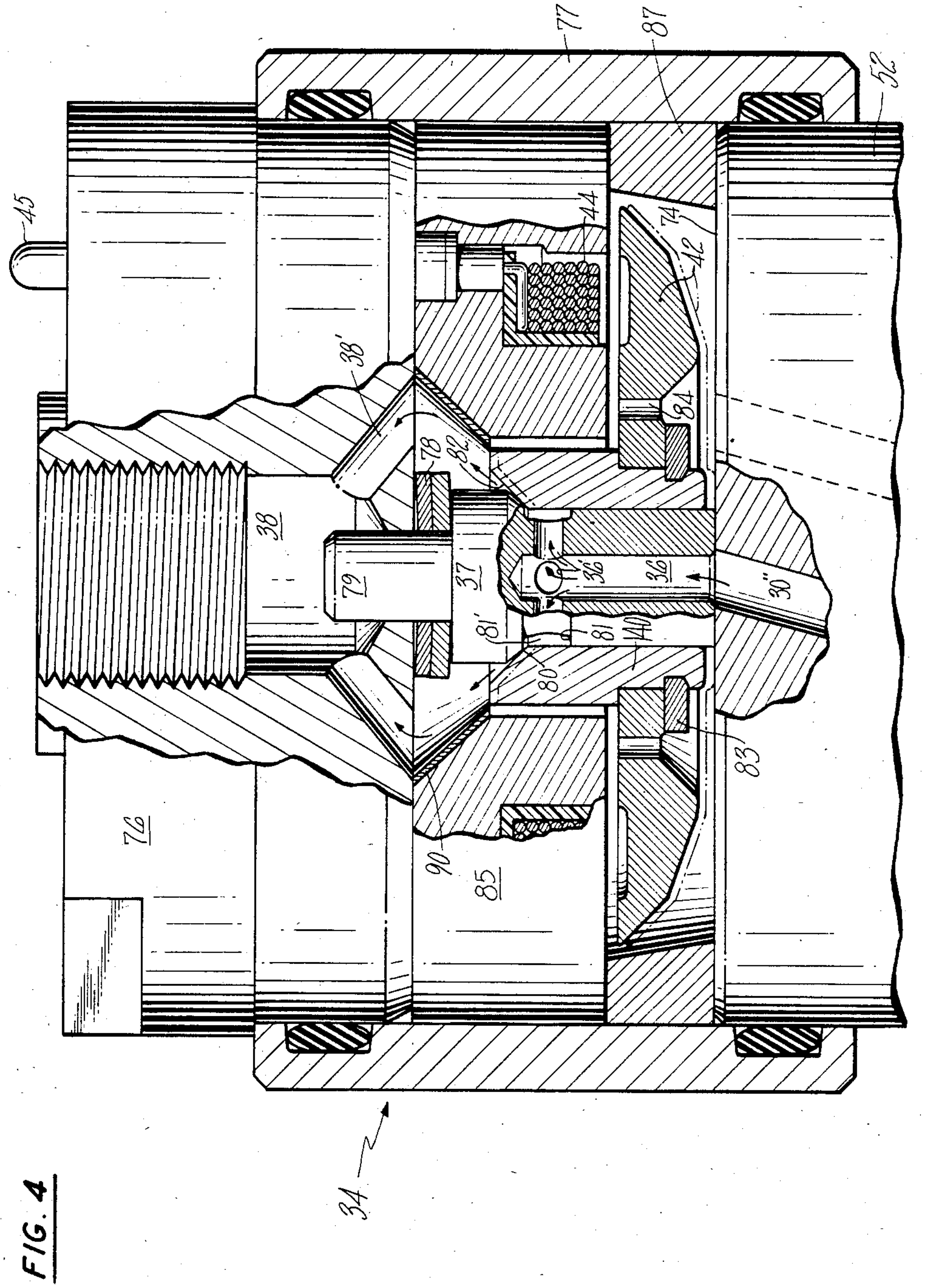
FIG. 4 is an enlarged partial view of FIG. 3 showing the solenoid actuated bypass valve in greater detail.

The amplitude of the stroke of valve sleeve 140 is determined by the contact of its surface 82 with the control edge 80 in the valve-closed position illustrated, and by contact of the lower end of the sleeve with the upper surface 74 of the injector body 52 in the full-open position illustrated in broken line in FIG. 4. That stroke or displacement of valve sleeve 140 may be closely controlled by the axial dimensioning of sleeve 140 and the selection of the angle of face 82 thereon. In the illustrated embodiment, that stroke is about 0.006 inch. Similarly, the axial positioning of the armature 42 on the valve sleeve 140 is preselected such that when the coil 44 is energized and the valve is closed as shown in FIG. 4, there remains a small air gap of approximately 0.004 inch between the armature and the stator 85. The stroke length of valve sleeve 140 determines the air gap spacing when the valve is fully open and, in the present instance, that air gap spacing is about 0.01 inch. Accordingly, adjustment of the open and closed air gap spacings may be controlled by adjustment of the valve sleeve stroke length and/or the positioning of the armature 42 on the valve sleeve 140 and/or the height of spacer 87.

A radially inner, upper surface of the stator 85 is conically beveled and includes a truncated conical spill deflector 90 of relatively hard metal to protect the stator. The region above the spill deflector 90 and below the undersurface of the valve cover 76 defines a low pressure plenum which communicates, via one or more angled bores 38' in the cover, with a large central bore 38 which defines the low pressure drain port associated with the valve.

Referring now to the operation of the solenoid valve assembly 34, although the valve is normally open, it has been illustrated in FIGS. 3 and 4 in its closed position. Assuming the valve sleeve 140 to be in its normally open position in which its lower end contacts surface 74 of injector body 52, a resulting gap or control orifice will exist between the control edge 80 and the surface 82 of the sleeve 140 through which fuel is free to pass in either direction depending upon pressure differences. For instance, if the fuel pressure in conduit 30'' is relatively high, as during a pumping stroke from pump 12, the open valve will serve to bypass fuel in the forward direction and exhaust it through drain port 38 to branch conduit 23 and thence to low pressure conduit 22. On the other hand, if the pump plunger is on its down stroke and is filling the pumping chamber, fuel may flow in the reverse direction by entering port 38 and exiting port 36.

When coil 44 is energized, the resulting electromagnetic forces cause armature 42 to be rapidly drawn upwardly until surface 82 of valve sleeve 140 contacts the control edge 80 of valve seat 37, thereby preventing fuel flow in either direction past the valve. So long as coil 44 remains energized, the valve will remain in this closed position illustrated in FIGS. 3 and 4.

Once the energizing signal is removed from coil 44, two forces act to rapidly open valve sleeve 140. Principally, assuming the pressure in conduit 30'' to be significantly greater than that in the region of port 38, the resulting hydraulic forces operate to open the valve. Secondarily, the valve-seat spindle 37 and the valve sleeve 140 are preferably oriented vertically such that the force of gravity aids in opening the valve. Typically, at the instant it is desired to open the valve 34 the fuel pressure in conduit 30'' will be on the order of several thousand psi, whereas the fuel pressure at port 38 will be less than 100 psi. The resulting differential in pressure will act axially downwardly on that narrow annular portion of the valve sleeve 140 which extends radially outward from the inner diameter of that valve sleeve to its point of contact with the control edge 80 of the valve seat 37. The remainder of the valve sleeve 140 and armature 42 radially outward of the control orifice between edge 80 and surface 82 is in a "low" pressure region of equalized force in both the opening and closing directions. In the illustrated embodiment, the inside diameter of the valve sleeve 140 is 0.236 inch and the diameter of the control edge 80 is 0.252 inch.

It is desirable that the valve sleeve 140 remains in its full-open position until the next closing signal is applied to the solenoid coil 44 in order to ensure a predictable and uniform interval from the instant of the signal until the valve is closed. A component of engine vibration axially of valve sleeve 140 could be capable of causing oscillation or "chatter" of sleeve 140, particularly during the low pressure phase of the pumping cycle, unless some bias force is maintained in the "valve opening" direction. The effect of gravity is not particularly significant and accordingly, a hydraulic bias of one pound or more of force is employed. Specifically, although most of the axially-facing areas of valve sleeve 140 and armature 42 are pressure-balanced in the axial direction, care is taken to provide some portion of the valve sleeve 140 and/or armature 42 which receives a net "opening" hydraulic bias while the valve is open. This is accomplished in the present embodiment by the axially-facing area at the bottom end of valve sleeve 140 being smooth and in full, liquid-excluding contact with smooth surface 74 of injector body 52. The resulting hydraulic force serving to bias valve sleeve 140 to the open position will then be the product of the low supply pressure, i.e., 25-50 psi, and the unbalanced area, i.e., about 0.066 square inch. The resulting force is in excess of one pound and substantially eliminates unwanted valve oscillations.

A solenoid valve assembly possessing the aforementioned characteristics is capable of being actuated from its normally open to its closed position in 1 millisecond or less and conversely, the valve is capable of being actuated from its fully closed to its fully opened position in 1 millisecond or less. In each instance there is no requirement for mechanical biasing means to aid or control the movement of the valve sleeve 140.

Although this invention has been shown and described with respect to detailed embodiments thereof, it will be understood by those skilled in the art that various changes in form and detail thereof may be made without departing from the spirit and scope of the claimed invention.

Having thus described a typical embodiment of my invention, that which is claimed as new and desired to secure by Letters Patent of the United States is:

1. A normally-open valve for rapidly controlling the flow of liquid between a high pressure supply and a relatively lower pressure drain comprising:
   - a valve housing having an inlet and a drain, said inlet being connected to said high pressure supply;
   - a stationary valve-seat spindle positioned in said housing, said valve-seat spindle having a first axial portion of one diameter and a second axial portion of greater diameter, an annular control edge of greater diameter than said first portion being formed on said second portion;
   - a cylindrical valve sleeve closely encircling said first portion of said seat spindle in axial sliding relation therewith, said valve sleeve being slideably displaceable between a closed position having a surface thereof in sealing contact with said valve-seat spindle control edge and an open position in which said surface is spaced from said valve-seat spindle control edge axially in the direction of said seat spindle first portion;
   - said valve-seat spindle including a flow passage therein in continuous fluid communication with said high pressure fluid inlet and having a discharge to a high pressure plenum region formed between said valve-seat spindle and said sleeve and radially inward of said control edge, said valve sleeve including a pressure reaction surface radially inward of said valve-seat spindle control edge and in continuous communication with said plenum;
   - an armature operatively connected to said valve sleeve; and
   - electromagnetic means responsive to an electrical current for displacing said armature to move said valve sleeve from said open position to said closed position, and wherein the pressure of said high pressure liquid in said plenum acts axially on said valve sleeve reaction surface to rapidly open said valve when said electrical current terminates and allow flow of said liquid by said valve to said drain.

2. The valve of claim 1 wherein said valve-seat spindle includes an axial bore in said first portion and at least one radial bore intersecting said axial bore to provide said discharge to said plenum.

3. The valve of claim 1 wherein said control edge contacting surface on said valve sleeve is substantially frustoconical relative to the sleeve axis.

4. The valve of claim 3 wherein said substantially frustoconical control edge contacting surface of said valve sleeve is such that its apex extends in the direction of valve opening.

5. The valve of claim 4 wherein said valve is intended for use in a predetermined spatial orientation, said valve housing being adapted for mounting in said orientation, said valve-seat spindle and said valve sleeve being substantially vertical in said orientation and said electromagnetic means being positioned relatively above said armature whereby the force of gravity aids in keeping said valve sleeve in said open position.

6. The valve of claim 2 wherein said housing includes a mounting surface, said mounting surface including said inlet, said seat spindle portion of said one diameter having an end surface including an end of said axial bore, and said seat spindle being mounted in said housing with said end surface thereof in substantially fluid-tight permanent sealed engagement with said housing mounting and with said bore end in register with said inlet.

7. The valve of claim 6 including biasing means in cooperative engagement with said seat spindle and said housing for urging said seat spindle end surface into said permanent sealed engagement with said housing mounting surface.

8. The valve of claim 7 wherein said seat spindle end surface and said housing mounting surface are machined for mutually contacting sealing engagement.

9. The valve of claim 1 wherein the differential in pressure of said liquid across said valve exceeds 5,000 psi.

10. The valve of claim 1 wherein actuation of said valve sleeve from said closed position to said open position is independent of mechanical bias means.

11. A solenoid-valve controlled fuel injector assembly comprising, in combination:
   - an injector nozzle including a nozzle body, an injector valve in the nozzle body operative between closed and open positions, means biasing said injector valve to said closed position, and a main fuel passage extending in said nozzle body from a first port to said injector valve, said biasing means being overcome and said injector valve being opened when a predetermined fuel pressure threshold in said nozzle fuel passage is exceeded;

said nozzle body including a bypass fuel passage extending from said main fuel passage to a second port; and a rapidly-responding, normally-open solenoid-controlled bypass valve assembly including a bypass valve housing integrally connected to said nozzle body and having a drain port, a stationary valve-seat spindle positioned in said bypass valve housing, said valve-seat spindle having a first axial portion of one diameter and a second axial portion of greater diameter than said first portion, an annular control edge of greater diameter than said first portion being formed on said seat spindle second portion, a valve sleeve closely encircling said first portion of said seat spindle in axial sliding relation therewith, said valve sleeve being slidably displaceable between a closed position having a surface thereof in sealing contact with said seat control edge and an open position in which said control edge contacting surface is spaced from said seat control edge axially in the direction of said seat spindle first portion, said valve-seat spindle including a bypass fuel passage therein, said seat spindle bypass fuel passage being in continuous fluid communication with said nozzle body bypass fuel passage via said second port and having a discharge to a plenum region formed between said spindle and said sleeve and radially inward of said control edge, said valve sleeve including a pressure reaction surface radially inward of said valve-sleeve spindle control edge and in continuous communication with said plenum, an armature operatively connected to said valve sleeve, and electromagnetic means responsive to an electrical current for displacing said armature to move said valve sleeve from said open position to said closed position to allow fuel pressure in said main fuel passage to exceed said injector valve threshold, and wherein the pressure of said fuel in said plenum acting axially on said valve sleeve reaction surface rapidly opens said bypass valve when said electrical current terminates and allows flow of said fuel by said bypass valve to said drain port thereby to decrease fuel pressure in said main fuel passage to less than said injector valve threshold.

12. The valve of claim 1 wherein said housing includes a mounting surface, said seat spindle portion of said one diameter having an end surface in mounted contact with said mounting surface, said open position of said valve sleeve being limited and determined by contact of an end of said valve sleeve with said mounting surface of said housing thereby to determine a stroke length of said valve sleeve between said open and said closed positions, said electromagnetic means including a stator, said stator being axially spaced from housing mounting surface by spacing means interposed axially between said stator and said housing surface in mutual axial contact therewith, said armature is rigidly affixed to said valve sleeve at a predetermined axial position therealong, and wherein the axial extent of said spacing means, said stroke length of said valve sleeve and said axial positioning of said armature on said valve sleeve cumulatively entirely determine an air gap spacing between said armature and said stator.

* * * * *